Patented June 29, 1948

2,444,263

UNITED STATES PATENT OFFICE 2,444,263

FUMARIC ACID-CONJUGATED HYDROCARBON ADDUCTS

Leslie C. Lane and Charles H. Parker, Jr., Stamford, Conn., assignors to American Cyanamid Company, New York, N. Y., a corporation of Maine No Drawing. Application July 17, 1945, Serial No. 605,638

8 Claims. (Cl. 260—514)

This invention relates to the preparation of adducts from fumaric acid and conjugated dienes. More particularly the invention relates to the preparation of fumaric acid adducts which are highly desirable in the production of improved resins.

The formation of adducts from certain $\alpha,\beta$ unsaturated dicarboxylic acids and conjugated dienes is well known in the art. Numerous examples in the literature show the formation of adducts from maleic acid or its anhydride and conjugated dienes. It is to be observed that there is a conspicuous absence of examples showing an adduct formation wherein fumaric acid is the $\alpha,\beta$ unsaturated acid even though very frequently it is stated in literature that fumaric acid may be substituted for maleic acid or its anhydride to yield equivalent results. Statements are further made to allege that fumaric acid is converted into maleic anhydride by heating. These allegations have been found to be contrary to fact and there is no evidence to support the theory of equivalency or the conversion of fumaric acid into maleic acid or its anhydride when used in adduct formation under the described conditions. Experimental results proved the contrary to be true, that is, fumaric acid does not react the same as the maleic compound in adduct preparations and there is an absence of a conversion from fumaric acid to maleic acid or its anhydride when treated with heat under the conditions described.

Heretofore, fumaric acid found little or no use in the production of adducts with conjugated dienes for subsequent utilization such as in the preparation of alkyd resins. This lack of utility has been the result of the failure to discover a suitable method for the formation of fumaric acid-conjugated diene adducts in an efficient and economical manner.

An object of this invention is to prepare adducts from fumaric acid and conjugated dienes.

Another object of this invention is to prepare adducts which are useful in the manufacture of resins.

A further object is to prepare fumaric acid-conjugated diene adducts which are especially useful in the manufacture of improved alkyd resins.

These and other objects are attained as herein described.

According to the present invention, adducts are efficiently prepared by heating fumaric acid and a conjugated diene in an aqueous medium. The preferred method for carrying out the reaction is achieved by the use of an autoclave accompanied by agitation but other methods may be used satisfactorily but with less efficiency, such as, for example, refluxing the mixture which requires considerably more time to effect a complete addition. Best results are obtained when the addition reaction takes place in a closed vessel where the temperature of the reactant mixture is held within the 100° C. to 200° C. range for about a period of from 30 to 90 minutes. However, the process is not restricted to the use of any definite reaction time, temperature or pressure.

If desired, there may be incorporated into the reaction mixture a stabilizer to prevent polymerization. Among other stabilizers, hydroquinone serves this purpose well when used in as little amounts as 0.02% based upon the weight of the diene used. Emulsifiers may also be used when desired to improve adduct formation when the conjugated diene is very insoluble in water, such as, for example, alloöcimene.

The utility of the adducts may be directed to various arts such as the preparation of resins by reaction with polyhydric alcohols, which in turn are suitable for use in lacquers, varnishes, and various coating compositions. Such resins also find use in sizing, water-proofing and crease-proofing of textiles as well as in the production of filaments, threads in the fields of casting and molding. The resins may be used in admixture with other natural or synthetic resins with or without the use of dyes, pigments, lubricants, catalysts, fillers and the like. The resins obtained by the use of the adducts of this invention are highly desirable for utilization in printing inks since they exhibit cardinal prerequisites of ink vehicles such as high gloss, good mineral spirits solubility, fast drying and good pigment wetting properties. The adducts are very desirable in the manufacture of alkyd resins for they not only fulfill the requirements of a substitute for phthalic anhydride in the large scale manufacture of alkyd resins, but go beyond such utility in yielding resins whose properties are superior to those obtained by the use of phthalic compounds. It is not common for air-dried alkyd resins to exhibit mar-proof properties but the resins prepared with the adducts of this invention consistently show such properties, which is an important contribution in the advancement of the art. Resins employing the new adducts in their preparation also exhibit superior color retention after subjection to baking. This paves the way for improvements in the field of baked enamels and other finishes such as in the furniture and automotive industries. It is also noteworthy that the fumaric adducts are superior in many respects to maleic adducts when used in the preparation of resins especially from the standpoint of color, reaction time, and drying properties. These differences support the evidence shown by infra-red spectroscopy that the fumaric acid is not converted to maleic acid during the process of adduct formation. The monohydric alcohol esters of the adducts disclosed herein are useful as plasticizers for resinous substances.

Some of the conjugated dienes which form adducts with fumaric acid are: butadiene, isoprene, piperylene, $\beta$-myrcene, alloöcimene, cyclopentadiene and the like. The dienes may be used individually or in admixture with one or more dienes. In the preparation of the adducts other reactants may be included such as hydroxy or poly-hydroxy organic compounds such as glycols, poly glycols, glycerols, pentaerythritol, mannitol, sorbitol, mono and di-glycerides and the like. Derivatives of hydroxy compounds may also be used to modify the properties of the alkyds. Among others, suitable modifiers are: fatty oil glycerides, glycerol monoalkyl ethers, and polyglycerol ethers, the aliphatic or aromatic acids, such as, fatty oil acids, phthalic acid, sebacic acid, stearic acid, oleic acid, and linoleic acid. Drying and non-drying oils may be also used as modifiers, such as linseed oil, walnut oil, tung oil, castor oil, and the like.

The following examples are given as a means of illustration and not in limitation. The term "parts" as used throughout the specification refers to "parts by weight." Various deviations may be made without departing from the spirit and scope of the invention.

Example 1

| | Parts |
|---|---|
| Isoprene-piperylene mixture (20% inert hydrocarbons) | 578 |
| Fumaric acid | 638 |
| Water | 825 |

The above materials are charged into an autoclave. The autoclave is then closed and heated at about 125° C. for about 90 minutes with agitation. A water-soluble adduct is formed giving a 90% yield.

Example 2

| | Parts |
|---|---|
| Isoprene-piperylene mixture (20% inert hydrocarbons) | 578 |
| Fumaric acid | 638 |
| Water | 825 |

The materials are charged into an autoclave. The autoclave is closed and heated at about 125° C. for about ½ hour with agitation. A water-soluble product is formed giving a yield of about 96%.

Example 3

| | Parts |
|---|---|
| Isoprene (20% inert hydrocarbons) | 580 |
| Fumaric acid | 640 |
| Water | 840 |
| Hydroquinone | 0.2 |

The materials are charged into an autoclave. The autoclave is closed and heated at about 125° C. for about 1 hour with agitation. After purification and dehydration the yield of adduct is found to be 94.6% based on the fumaric acid used.

Example 4

| | Parts |
|---|---|
| Isoprene (20% inert hydrocarbons) | 578 |
| Fumaric acid | 638 |
| Water | 825 |
| Hydroquinone | 2 |

The above materials are charged into an autoclave. The autoclave is closed and heated at about 125° C. for ½ hour with agitation. The solution is steam distilled, filtered and vacuum concentrated to yield a white crystalline product.

Example 5

| | Parts |
|---|---|
| Alloöcimene (5% inert hydrocarbons) | 340 |
| Fumaric acid | 290 |
| Water | 500 |

The above materials are charged into an autoclave. The autoclave is closed and heated at about 200° C. for a period of about ½ hour with agitation. The product is a crystalline solid.

Example 6

| | Parts |
|---|---|
| Alloöcimene (5% inert hydrocarbons) | 340 |
| Fumaric acid | 290 |
| Water | 550 |

The above materials are charged into an autoclave. The autoclave is closed and heated at about 150° C. for a period of about ½ hour with agitation. The product is a crystalline solid.

Example 7

Fumaric acid is reacted with butadiene for about ½ hour at about 200° C. The product is washed with benzene to yield a white solid.

Resin "A"

| | Parts |
|---|---|
| Isoprene-fumaric acid adduct | 184 |
| Refined linseed monoglyceride | 243 |
| Glycerol | 32 |

The above materials are charged into a kettle and heated at about 220° C. until the desired viscosity and acid number are obtained. Sixty parts of the product are dissolved in 40 parts of mineral spirits giving an acid number of 14 and a viscosity of 37 poises. An air-dried film of the resin is mar-proof and shows good flexibility. Upon baking at about 150° C. for about ½ hour a hard film results which shows excellent color retention along with other desirable properties.

Resin "B"

| | Parts |
|---|---|
| Isoprene-fumaric adduct | 180 |
| Refined linseed monoglyceride | 370 |
| Glycerol | 15 |
| Fumaric acid | 3 |

The above materials are charged into a kettle and heated at about 220° C. until the desired acid number and viscosity are obtained. Seventy-five parts of product are dissolved in 25 parts of mineral spirits to give a viscosity of 18 poises and an acid number of 4. The solution is flowed out on a panel to give an air-dried film having good properties of flexibility, color and hardness. Upon baking for about a half hour the film has excellent hardness and color retention.

Resin "C"

| | Parts |
|---|---|
| Isoprene-fumaric adduct | 184 |
| Linseed-acids | 287 |
| Pentaerythritol | 108 |

The above materials are heated at about 220° C. until the desired acid number is attained. The resin has an acid number of 26.6 and a 50% solution in hydrogenated naphtha solvent gives a viscosity of 14 poises.

Resin "D"

| | Parts |
|---|---|
| Isoprene fumaric adduct | 184 |
| Refined castor oil | 60 |
| Glycerine | 95 |
| Soya fatty acids | 54 |

The above materials are charged into a kettle and heated at 220° C. until the desired acid number is reached. The product is soluble in xylol giving a 50% solids content.

Resin "E"

| | Parts |
|---|---|
| Phthalic anhydride | 148 |
| Isoprene-fumaric adduct | 4 |
| Refined castor oil | 60 |
| Soya fatty acids | 54 |
| Glycerine | 94 |

The materials are all charged into a kettle and heated to 235° C. until a viscosity of about 13 poises is reached, and then heated at about 200° C. for about 2 hours. A 50% xylol solution of the final product has a viscosity of about 27 poises and an acid number of 10.2.

Resin "F"

| | Parts |
|---|---|
| Resin from Example 8 | 65 |
| Butylated urea-formaldehyde resin | 35 |
| Cobalt naphthenate | 0.005 |

The above materials are mixed, then flowed out on panels and baked at 150° C. for ½ hour. The film has good mar-proof properties, good hardness, is tack free and has an exceptionally light color.

We claim:

1. A process for the preparation of fumaric acid adducts comprising reacting fumaric acid and at least one conjugated diene hydrocarbon in an aqueous medium in a closed vessel at a temperature between 100 and 200° C. until the reaction is substantially complete.

2. A process for the preparation of a fumaric acid-isoprene adduct comprising reacting fumaric acid and isoprene in an aqueous medium in a closed vessel at a temperature between 100 and 200° C. until the reaction is substantially complete.

3. A process for the preparation of a fumaric acid butadiene adduct comprising reacting fumaric acid and butadiene in an aqueous medium in a closed vessel at a temperature between 100 and 200° C.

4. A process for the preparation of a fumaric acid-alloöcimene adduct comprising reacting fumaric acid and alloöcimene in an aqueous medium in a closed vessel at a temperature between 100 and 200° C. until the reaction is substantially complete.

5. A fumaric acid-conjugated diene hydrocarbon adduct prepared according to the process disclosed in claim 1.

6. A fumaric acid-isoprene adduct prepared according to the process of claim 2.

7. A fumaric acid-butadiene adduct prepared according to the process of claim 3.

8. A fumaric acid-alloöcimene adduct prepared according to the process of claim 4.

CHARLES H. PARKER, Jr.
LESLIE C. LANE.

REFERENCES CITED

The following references are of record in the file of this patent:

UNITED STATES PATENTS

| Number | Name | Date |
|---|---|---|
| 1,944,731 | Diels, et al. | Jan. 23, 1934 |
| 1,967,862 | Carothers, et al. | July 24, 1934 |
| 1,978,062 | Scheyer | Oct. 23, 1934 |
| 1,993,037 | Littman | Mar. 5, 1935 |
| 2,039,243 | Krzikalla, et al. | Apr. 28, 1936 |
| 2,047,398 | Voss, et al. | July 14, 1936 |
| 2,275,383 | Soday | Mar. 3, 1942 |
| 2,275,385 | Soday | Mar. 3, 1942 |
| 2,344,831 | Ott | Mar. 21, 1944 |

FOREIGN PATENTS

| Number | Country | Date |
|---|---|---|
| 627,783 | Germany | Mar. 23, 1936 |

OTHER REFERENCES

Eschinazi et al., Jour. Org. Chem., vol. 8, pages 179–188.

Beilstein, Handbuch der Org. Chem., vol 2 (4th ed., 1930), page 738.

Karrer, "Organic Chemistry" (Nordemann Publishing Co., 1938), pages 45–46.